US006865392B2

(12) United States Patent
Roman

(10) Patent No.: US 6,865,392 B2
(45) Date of Patent: Mar. 8, 2005

(54) USING ALTERNATE POLARIZATION IN FIXED WIRELESS SYSTEM DEPLOYMENT FOR IMPROVED CAPACITY

(75) Inventor: Vincentzio I Roman, Reading, MA (US)

(73) Assignee: ADC Telecommunications, Inc., Minnetonka, MN (US)

(*) Notice: Subject to any disclaimer, the term of this patent is extended or adjusted under 35 U.S.C. 154(b) by 0 days.

(21) Appl. No.: 09/183,715

(22) Filed: Oct. 30, 1998

(65) Prior Publication Data

US 2003/0113116 A1 Jun. 19, 2003

(51) Int. Cl.[7] ............................................. H04Q 7/20
(52) U.S. Cl. ..................... 455/446; 455/449; 455/25
(58) Field of Search ................. 455/446, 449, 455/454, 25, 3.01, 562, 500; 343/700, 725, 893

(56) References Cited

U.S. PATENT DOCUMENTS

| 5,475,864 A | * | 12/1995 | Hamabe ..................... 455/33.1 |
| 5,668,610 A | * | 9/1997 | Bossard et al. ................ 725/62 |
| 5,724,666 A | | 3/1998 | Dent ........................... 455/562 |
| 5,838,670 A | * | 11/1998 | Billstrom ..................... 370/328 |
| 5,949,793 A | * | 9/1999 | Bossard et al. ............. 370/487 |
| 6,006,069 A | * | 12/1999 | Landston ..................... 455/62 |
| 6,205,337 B1 | * | 3/2001 | Boch .......................... 455/447 |
| 6,275,704 B1 | * | 8/2001 | Dixon ......................... 455/446 |
| 6,301,482 B1 | * | 10/2001 | Shohara ...................... 455/452 |
| 6,418,316 B2 | * | 7/2002 | Hildebrand et al. ......... 455/447 |

FOREIGN PATENT DOCUMENTS

| EP | 0796024 | 11/1994 | ............ H04Q/7/36 |
| EP | 0847209 | 12/1996 | ............ H04Q/7/20 |
| WO | 97/28615 | 1/1996 | ............ H04B/7/08 |

* cited by examiner

Primary Examiner—Cong Van Tran
(74) Attorney, Agent, or Firm—Fogg & Associates, LLC; David N. Fogg

(57) ABSTRACT

A communication system. The communication system communicates to a number of subscribers. The communication system includes a number of communication circuits which are disposed to divide a region into communication areas. Each communication circuit communicates using a first polarization in a first portion of its communication area and communicates using a second, different polarization in a second portion of its communication area. Additionally, adjacent portions of the communication areas of the communication circuits use the same polarization.

10 Claims, 2 Drawing Sheets

USING ALTERNATE POLARIZATION IN FIXED WIRELESS SYSTEM DEPLOYMENT FOR IMPROVED CAPACITY

TECHNICAL FIELD

The present invention relates generally to the field of telecommunications and, in particular, to a system and method of communicating data.

BACKGROUND

As the need for information and entertainment by consumers grows, various pipelines have been developed to deliver this data to the different subscribers and users. A pipeline is a system that communicates data from a data provider (e.g., a television station, website on the Internet) to a subscriber. One current pipeline used by Internet service providers such as AmericaOnLine is the telephony system. The subscribers use a computer modem to connect to the Internet service provider over the telephony system. This system, however, is often ineffective for conveying large quantities of data because of bandwidth limitations. Some subscribers have installed higher-speed telephonic connections but due to the associated costs this practice is not widespread.

Other pipelines deliver data with varying degrees of success. Conventionally, television stations use a wireless pipeline for its delivery system. The stations broadcast a signal in a dedicated portion of the electromagnetic spectrum and subscribers access the signal with roof-top antennas. Another conventional pipeline is the cable system which uses coaxial cable to deliver video with increased quality and quantity. Recent advances in the cable standards and products including the two-way cable modems have provided two-way communication between the service provider and the subscribers. In addition to the television broadcasting, this advance does allow for Internet access and telephony service over the traditional cable systems.

Recently, the industry has designed various types of fixed point to multipoint wireless systems which provide both one-way and two-way communications. One example of these types of systems is the Multichannel Multipoint Distribution Service (MMDS), traditionally used for television broadcasting. There has also been development of the Wireless Loop systems, providing a cost-efficient alternative to the copper wires in the local loop (i.e., the last segment in the telephony network deployment). Additionally, the Federal Communication Commission (FCC) recently approved the two-way use of MMDS thereby allowing a wide variety of interactive services within the MMDS spectrum including classic telephony, Internet access, data for business applications and interactive video.

Moreover, the FCC has also recently auctioned off a large amount of bandwidth (1.3 GHz) for two-way applications in the frequency range of 28 to 31 GHz known as Local Multipoint Distribution System (LMDS). Internationally LMDS is also employed under different names and at various frequencies within the range of 10 to 40 GHz for both one-way and two-way communications. As both the MMDS and LMDS employ wide bandwidth with the ability to deliver large amounts of information, they are categorized as broadband wireless systems. Because wireless systems like MMDS and LMDS as well as others have limited bandwidth availability while also providing broadband services to their users, these systems need an efficient solution to the basic capacity problem.

Another issue unique to wireless systems exists which must be addressed when providing any solution to this limited capacity problem. As the radio waves propagate in open space, the transmissions of one link may interfere with the transmissions from another link operating on the same frequency channel. This problem limits the frequency reuse in wireless systems deployment. In order to reuse the same frequency channel at different areas, it is necessary to provide sufficient separation between the different areas that use the same frequency band which thereby limits interference in the different areas.

Currently this separation can be achieved by distancing the areas from one another through sectorization and/or polarization. Sectorization is the process of using directive antennas in sectors within the different communications areas. Polarization provides for the communicating of a signal with a different polarization in the different areas of frequency reuse by implementing differently polarized antennas within the different communication areas.

For the reasons stated above, and for other reasons stated below which will become apparent to those skilled in the art upon reading and understanding the present specification, there is a need in the art for a communication system in a limited frequency spectrum which provides for enhancements in capacity through better frequency reuse and by allowing a process of gradually increasing capacity and sectorization while minimizing the associated costs.

SUMMARY

The above mentioned problems with communication systems and other problems are addressed by the present invention and which will be understood by reading and studying the following specification. A communication system is described which uses different polarization in selected regions to reduce interference between cells. The communication system provides for uni-directional or bi-directional communication of data including transmitting, receiving or both transmitting and receiving the communication signals. Advantageously, this use of different polarizations for signals also provides the ability to increase capacity and sectorization at reduced capital costs.

In particular, an illustrative embodiment of the present invention provides a communication system that communicates data to a number of subscribers. The communication system includes a number of communication circuits. The strategic placement of these circuits within a communication region provides for a division of the region into communication areas, wherein each of the communication circuits is associated with a particular communication area. Each communication circuit communicates one polarization in one portion of its communication area and a different polarization in a second portion of its area. Additionally, adjacent portions of the communication areas of the communication circuits use the same polarization.

DETAILED DESCRIPTION

In the following detailed description, reference is made to the accompanying drawings which form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense.

Figure 1:
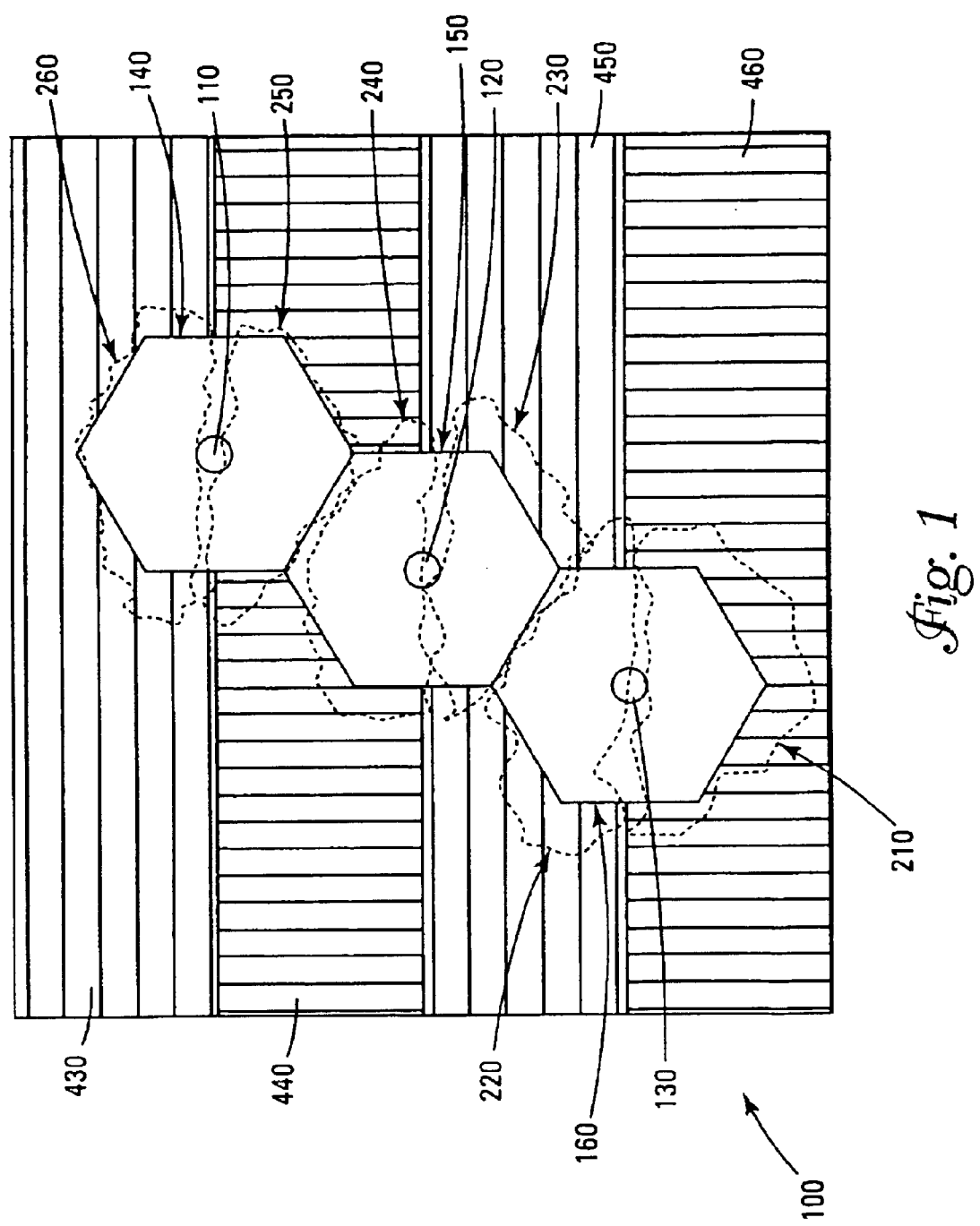
FIG. 1 is a representational diagram of an illustrative embodiment of a communication system according to the teachings of the present invention.

FIG. 1 is a representational diagram of an illustrative embodiment of a communication system according to the teachings of the present invention. The communication system provides for uni-directional or bi-directional communication of data in region 100 between communication circuits 110, 120 and 130 and the subscribers within their respective communication areas or cells 140, 150 and 160. A communication circuit may include but is not limited to a base station, hub or other communication circuit that communicates RF signals in a wireless communication system. The communication system of FIG. 1 may include more communication circuits and communication areas, but FIG. 1 is limited to the three communication areas for sake of clarity. Communication circuits 110, 120 and 130 can communicate audio, video or data for use by a computer, a television, a telephony system or other appropriate terminal of subscribers within communication areas 140, 150 and 160.

Communication circuits 110, 120 and 130 communicate their signals using a different polarization for different portions of their respective communication areas 140, 150 and 160. Additionally the receivers for the subscribers located in communication areas 140, 150 and 160 are set up to communicate through the particular polarization for the area in which they reside. For example, communication circuit 110 communicates a signal of one polarization to subscribers located in portion 260 of communication area 140 while communicating a signal of a different polarization to subscribers located in portion 250 of communication area 140. Similarly communication circuit 120 sends a signal of one polarization to subscribers located in portion 240 of communication area 150 while sending a signal of a different polarization to subscribers located in portion 230 of communication area 150. Likewise, communication circuit 130 sends a signal of one polarization to subscribers located in portion 220 of communication area 160 while sending a signal of a different polarization to subscribers located in portion 210 of communication area 160.

In one embodiment, the communication circuits within portions of adjacent communication areas communicate and the subscribers within the portion of the adjacent communication areas receive a signal of the same polarization. For example as shown in FIG. 1, communication circuits 110 and 120 communicate a signal of one polarization for adjacent portions 250 and 240 of communication areas 140 and 150, respectively. Similarly, communication circuits 120 and 130 communicate a signal of one polarization for adjacent portions 230 and 220 of communication areas 150 and 160.

In another embodiment, communication circuits 110, 120 and 130 communicate with the subscribers in their respective communication areas 140, 150 and 160 through a signal that is either horizontally or vertically polarized. For portions 210, 240 and 250 of communication areas 140, 150 and 160, the signal is vertically polarized and for portions 220, 230 and 260 of communication areas 140, 150 and 160, the signal is horizontally polarized.

In another embodiment, the division of the communication areas into portions is such that the area is divided into halves wherein each portion is approximately one half of the communication area so that a communication circuit for a communication area will communicate a signal of one polarization in approximately one half of the communication area while communicating a signal of a different polarization in approximately the other half of the communication area. The subscribers within the respective halves of the communication area will be set up to receive a signal of a certain polarization depending on where they are in the communication area.

Figure 2:
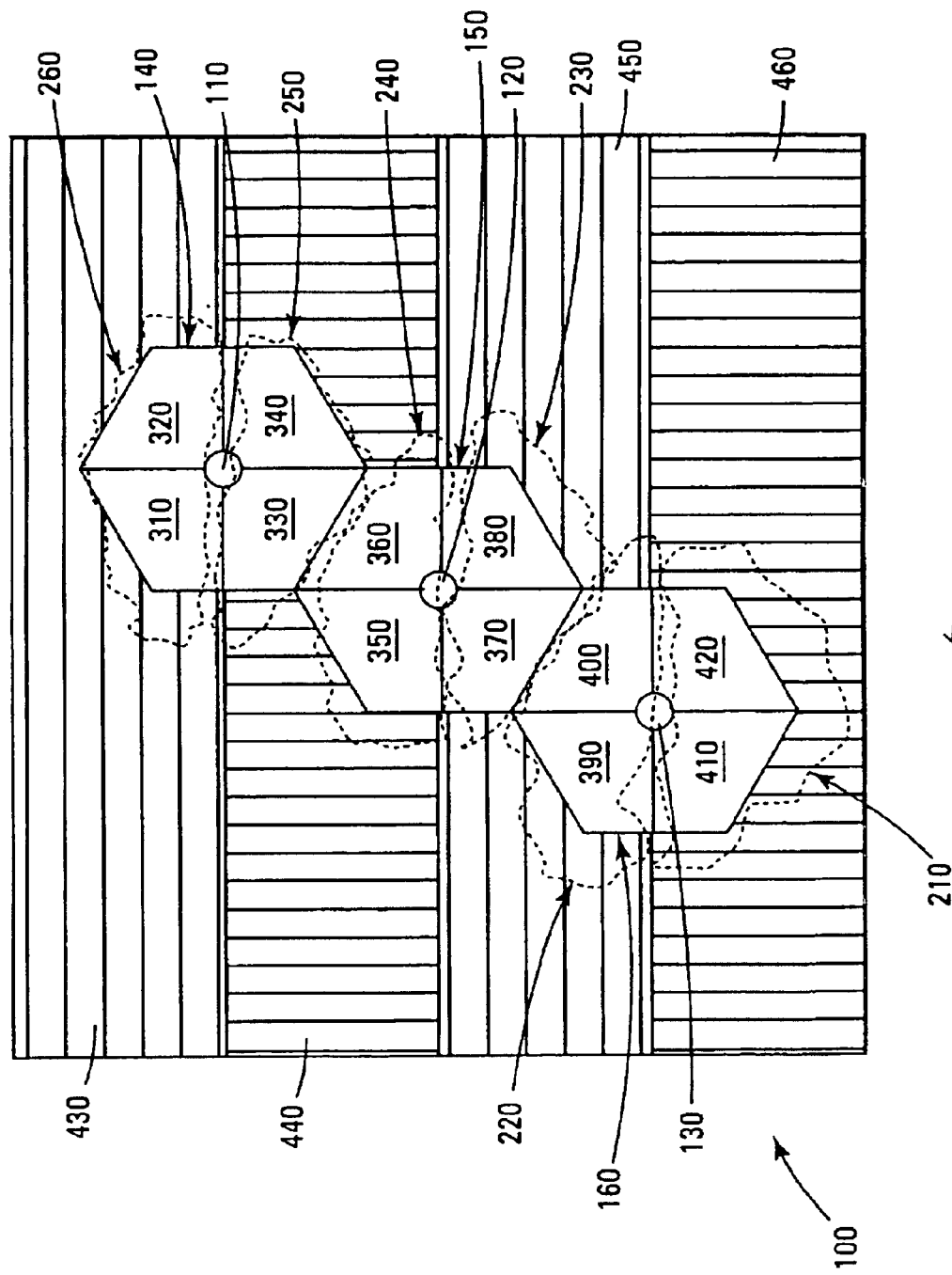
FIG. 2 is a diagram of another embodiment of a communication system according to the teachings of the present invention containing a sector and subband layout.

As shown in FIG. 2 in another embodiment, the communication areas are divided into sectors. For the sake of clarity, FIG. 2 will use the same identification numbers used in FIG. 1 for those elements that correspond. Communication area 140 is divided into sectors 310, 320, 330 and 340 with communication circuit 110 in the middle of communication area 140. Similarly, communication area 150 is divided into sectors 350, 360, 370 and 380 with communication circuit 120 in the middle of communication area 150. Likewise, communication area 160 is divided into sectors 390, 400, 410 and 420 with communication circuit 130 in the middle of communication area 160. All subscribers within a particular sector are set to receive a signal with the same subband within a particular frequency spectrum. In particular, sectors 320, 330, 360, 370, 400 and 410 use subband A and sectors 310, 340, 350, 380, 390 and 420 use subband B. Therefore, depending on which sector of communication areas 140, 150 and 160 that respective communication circuits 110, 120 and 130 is communicating towards, communication circuits 110, 120 and 130 will communicate on a particular subband. Moreover all subscribers within sectors 310–420 are set to receive a signal of a particular subband.

This sectorization pattern of FIG. 2 is only one embodiment and is not limited to such pattern. Other embodiments include differing numbers and patterns of sectors within the communication areas as well as differing sectorization patterns within different communication areas. The alternating polarization within and across communication areas is independent of the sectorization patterns of the communication areas. The polarization of a communication region is preset prior to the establishment of the location of the subscribers and the sectorization therein. Additionally, this alternating polarization remains constant even when the communication areas and their sectorization patterns are modified, for example to accommodate more subscribers. This consistency of the polarization provides the advantage of not altering subscribers' antennas to account for a change in the polarization each time the communication areas and their sectorization are increased, decreased or changed in any other way. Other embodiments provide for uni-directional and bi-directional communication by communication circuits 110, 120 and 130. In particular, communication circuits 110, 120 and 130 can transmit, receive or both transmit and receive the signals using the differing polarizations to provide sufficient separation.

In another embodiment referring back to FIG. 1, communication circuits 110, 120 and 130 are disposed in region 100 to form boundaries between communication regions 430, 440, 450 and 460. Communication circuits 110, 120 and 130 communicate a signal of either a first or second polarization dependent upon which of the communication regions 430, 440, 450 and 460 the circuits are communicating toward. In particular communication circuit 110 communicates a signal of one polarization to subscribers located in communication region 430, while communicating a signal of a different polarization to subscribers located in communication region 440. Similarly, communication circuit 120 communicates a signal of one polarization to subscribers located in communication region 440, while communicating a signal of a different polarization to subscribers located in communication region 450. Likewise, communication circuit 130 communicates a signal of one polarization to subscribers located in communication region 450 and communicates a signal of a different polarization to subscribers located in communication region 460.

In one embodiment, communication regions 430 and 450 are designated as regions wherein the subscribers receive a signal that is horizontally polarized, while communication regions 440 and 460 are designated as regions wherein the subscribers receive a signal that is vertically polarized. In another embodiment, communication circuits 110, 120 and 130 are disposed to form communication areas 140, 150 and 160 within communication regions 430, 440, 450 and 460. In particular, communication circuit 110 communicates a signal of one polarity (e.g., horizontal) to portion 260 (located in communication region 430) of communication area 140, while communicating a signal of a different polarity (e.g., vertical) to portion 250 (located in communication region 440) of the same communication area. Similarly, communication circuit 120 communicates a signal of one polarity (e.g., vertical) to portion 240 (located in communication region 440) of communication area 150, while communicating a signal of a different polarity (e.g., horizontal) to portion 240 (located in communication region 450) of the same communication area. Likewise, communication circuit 130 communicates a signal of one polarity (e.g., horizontal) to portion 220 (located in communication region 450) of communication area 150, while communicating a signal of a different polarity (e.g., vertical) to portion 210 (located in communication region 460) of the same communication area.

Referring again to FIG. 2 as previously described, communication areas 140, 150 and 160 are divided into sectors in which all subscribers for a particular sector receive a signal of the same subband frequency. As previously described, communication circuits 110, 120 and 130 communicate signals with different subband frequencies depending on which sector the communication circuit is communicating towards. In one embodiment, the boundaries of communication regions 430, 440, 450 and 460 lay along the boundaries of the sectors of communication areas 140, 150 and 160. In particular, the boundary between communication regions 430 and 440 lay along both the boundary between sectors 310 and 330 and the boundary between sectors 320 and 340 of communication area 140. Similarly, the boundary between communication regions 440 and 450 lay along both the boundary between sectors 350 and 370 and the boundary between sectors 360 and 380 of communication area 150. Likewise, the boundary between communication regions 450 and 460 lay along both the boundary between sectors 390 and 410 and the boundary between sectors 400 and 420. Again, the sectorization and the polarization of the signal being communicated by the communication circuits are independent of one another, allowing for the altering of the sectorization patterns of the communication areas while maintaining a consistent polarization pattern.

CONCLUSION

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. For example, the specific communication area layouts along with the sectorization layouts of these areas can be varied by adding or subtracting areas and sectors and/or modifying the areas' and sectors' shape and size and still fall within the spirit and scope of the present invention.

What is claimed is:

1. A communication system comprising:
    a plurality of communication circuits disposed to divide a region into communication areas;
    wherein each communication area is divided into at least a first portion and a second portion;
    wherein each communication circuit communicates using a first polarization in the first portion of its communication area and communicates using a second polarization in the second portion of its communication area;
    wherein adjacent first portions of communication areas for the plurality of communication circuits use the same polarization to form substantially linear communication regions of the same polarization;
    wherein each communication area is further divided into at least a first sector and a second sector;
    wherein the communication circuit communicates using a first subband within a particular frequency spectrum in the first sector and the communication circuit communicates using a second subband within a particular frequency spectrum in the second sector;
    wherein the division of each communication area into at least the first portion and second portion is independent of the division of each communication area into at least the first sector and second sector.

2. The communication system of claim 1, wherein each communication area is divided into a first sector, a second sector, a third sector, and a fourth sector;
    wherein the communication circuit communicates using a first subband within a particular frequency spectrum in the first sector and second sector, and the communication circuit communicates using a second subband within a particular frequency spectrum in the third sector and fourth sector.

3. The communication system of claim 1, wherein the first polarization comprises horizontal polarization and the second polarization comprises vertical polarization.

4. The communication system of claim 1, wherein each of the first portion and second portion of each communication area comprises approximately one half of the communication area.

5. The communication system of claim 1, wherein each communication circuit transmits and receives signals using at least a first and second polarization, and at least a first and second subband of a frequency spectrum.

6. A method for communication comprising:

dividing a region into a plurality of communication areas, each communication area including a communication circuit;

dividing each of the plurality of communication areas into at least a first communication area portion and a second communication area portion and into at least a first communication area sector and a second communication area sector;

wherein the division into the first communication area portion and second communication area portion is independent of the division into the first communication area sector and second communication area sector;

communicating using a first polarization in the first communication area portion, a second polarization in the second communication area portion, a first subband of a frequency spectrum in the first communication area sector and a second subband of a frequency spectrum in the second communication area sector;

wherein adjacent first communication area portions for a plurality of communication circuits use the same polarization to form a region of belts having the same polarization.

7. The method of claim 6, wherein communicating includes using the same polarization for signals in adjacent communication areas.

8. The method of claim 6, wherein the first polarization comprises horizontal polarization and the second polarization comprises vertical polarization.

9. The method of claim 6, wherein the first communication area portion and second communication area portion of each communication area comprises approximately one half of the communication area.

10. The method of claim 6, wherein communicating comprises transmitting and receiving.

* * * * *